US007069293B2

(12) United States Patent
Cox et al.

(10) Patent No.: US 7,069,293 B2
(45) Date of Patent: Jun. 27, 2006

(54) METHODS, SYSTEMS AND COMPUTER PROGRAM PRODUCTS FOR DISTRIBUTION OF APPLICATION PROGRAMS TO A TARGET STATION ON A NETWORK

(75) Inventors: David E. Cox, Raleigh, NC (US); Kent F. Hayes, Jr., Chapel Hill, NC (US); David B. Lindquist, Raleigh, NC (US); John R. McGarvey, Apex, NC (US); Abdi Salahshour, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 09/870,608

(22) Filed: May 31, 2001

(65) Prior Publication Data

US 2002/0032763 A1    Mar. 14, 2002

Related U.S. Application Data

(62) Division of application No. 09/211,528, filed on Dec. 14, 1998, now Pat. No. 6,510,466.

(51) Int. Cl.
*G06F 15/16* (2006.01)
*G06F 9/44* (2006.01)
*G06F 9/445* (2006.01)

(52) U.S. Cl. .................. 709/203; 709/228; 709/218; 709/219; 717/171; 717/172

(58) Field of Classification Search ............... 709/207, 709/217, 226, 221, 223, 203, 228, 219, 218; 717/11, 171, 172

See application file for complete search history.

(56) References Cited

U.S. PATENT DOCUMENTS

| 5,263,165 A | 11/1993 | Janis ........................ 395/725 |
| 5,440,739 A | 8/1995 | Beck et al. ................ 709/221 |
| 5,554,979 A | 9/1996 | Kohar et al. ........... 340/825.72 |
| 5,680,615 A | 10/1997 | Marlin et al. .............. 707/103 |

(Continued)

FOREIGN PATENT DOCUMENTS

WO          9850853          11/1998

OTHER PUBLICATIONS

"A Common Desktop Environment for Platforms Based on the UNIX Operating System," By B.E. Cripe, J.A. Brewster, and D.E. Laursen, Hewlett-Packard Journal, vol. 47, No. 2, Apr. 1, 1996, pp. 6-14.

(Continued)

*Primary Examiner*—Rupal Dharia
*Assistant Examiner*—Djenane Bayard
(74) *Attorney, Agent, or Firm*—Myers Bigel Sibley & Sajovec; Stephen A. Calogero

(57) ABSTRACT

Methods, systems and computer program products for management of application programs on a network including a server supporting client stations are provided. The server provides applications on-demand to a user logging in to a client supported by the server. Mobility is provided to the user and hardware portability is provided by establishing a user desktop interface responsive to a login request which presents to the user a desktop screen through a web browser interface which accesses and downloads selected application programs from the server responsive to a request from the user on the user desktop screen at the client. The application program is then provided from the server and executed at the client. The application program may further be customized to conform to the user's preferences and may also provide for license use management by determining license availability before initiating execution of the application program. Finally, software distribution and installation may be provided from a single network management server.

21 Claims, 9 Drawing Sheets

U.S. PATENT DOCUMENTS

| | | | | |
|---|---|---|---|---|
| 5,689,708 | A | 11/1997 | Regnier et al. | 709/302 |
| 5,708,709 | A | 1/1998 | Rose | 380/4 |
| 5,745,879 | A | 4/1998 | Wyman | 705/1 |
| 5,748,896 | A | 5/1998 | Daly et al. | 709/223 |
| 5,764,887 | A | 6/1998 | Kells et al. | 713/200 |
| 5,771,354 | A | 6/1998 | Crawford | 709/229 |
| 5,778,368 | A | 7/1998 | Hogan et al. | 707/10 |
| 5,813,009 | A | 9/1998 | Johnson et al. | 707/100 |
| 5,845,077 | A | 12/1998 | Fawcett | 709/221 |
| 5,848,243 | A | 12/1998 | Kulkarni et al. | 709/224 |
| 5,867,713 | A * | 2/1999 | Shrader et al. | 717/176 |
| 5,875,327 | A | 2/1999 | Brandt et al. | 713/1 |
| 5,881,236 | A | 3/1999 | Dickey | 709/221 |
| 5,911,066 | A | 6/1999 | Williams et al. | 709/300 |
| 5,919,247 | A * | 7/1999 | Van Hoff et al. | 709/217 |
| 5,996,012 | A * | 11/1999 | Jarriel | 709/226 |
| 6,006,035 | A * | 12/1999 | Nabahi | 717/175 |
| 6,047,194 | A * | 4/2000 | Andersson | 455/466 |
| 6,070,190 | A | 5/2000 | Reps et al. | 709/224 |
| 6,105,063 | A | 8/2000 | Hayes, Jr. | 709/223 |
| 6,105,066 | A | 8/2000 | Hayes, Jr. | 709/226 |
| 6,105,069 | A | 8/2000 | Franklin et al. | 709/229 |
| 6,108,712 | A | 8/2000 | Hayes, Jr. | 709/246 |
| 6,131,112 | A * | 10/2000 | Lewis et al. | 709/207 |
| 6,175,363 | B1 | 1/2001 | Williams et al. | 345/334 |
| 6,175,832 | B1 | 1/2001 | Luzzi et al. | 707/10 |
| 6,182,142 | B1 | 1/2001 | Win et al. | 709/229 |
| 6,192,414 | B1 | 2/2001 | Horn | 709/239 |
| 6,202,206 | B1 * | 3/2001 | Dean et al. | 717/177 |
| 6,611,498 | B1 * | 8/2003 | Baker et al. | 370/252 |
| 2003/0110241 | A1 * | 6/2003 | Cheng et al. | 709/221 |

OTHER PUBLICATIONS

"Administration of Graphic User Interface and Multimedia Objects Using Cooperating Processing," IBM Technical Disclosure Bulletin, vol. 37, No. 9, Sep. 1, 1994, pp. 675-678.

http://nf/pdc97/profiles_and_policies.htm "Guide to Microsoft Windows NT 4.0 Profiles and Policies" pp. 1-76.

http://www/ietf.org/html.charters/acap-charter.html "Application Configuration Access Protocol (acap)," 68 pages.

IBM Network Station Manager for Windows NT Server 4.0, Chapter 5. Using the IBM Network Station Manager, pp. 5-1 to 5-15.

http://www.software.ibm.com/os/warp/library/sq202822.htm, "WorkSpace on-Demand Handbook," Chapters 2.3.1; 6.2; 6.3; 6.3.1; 6.3.3; 6.5.

http://www.triteal.com/SoftNC, Java Desktop Environment from Triteal, pp. 1-2.

http://java.sun.com/products/hot-javaviews/admin.html, "HotJava Views," pp. 1-24.

http://esuite.lotus.com/eSuite/eSuite, "The Right Work Environment for Network Centric Computing," 24 pages.

* cited by examiner

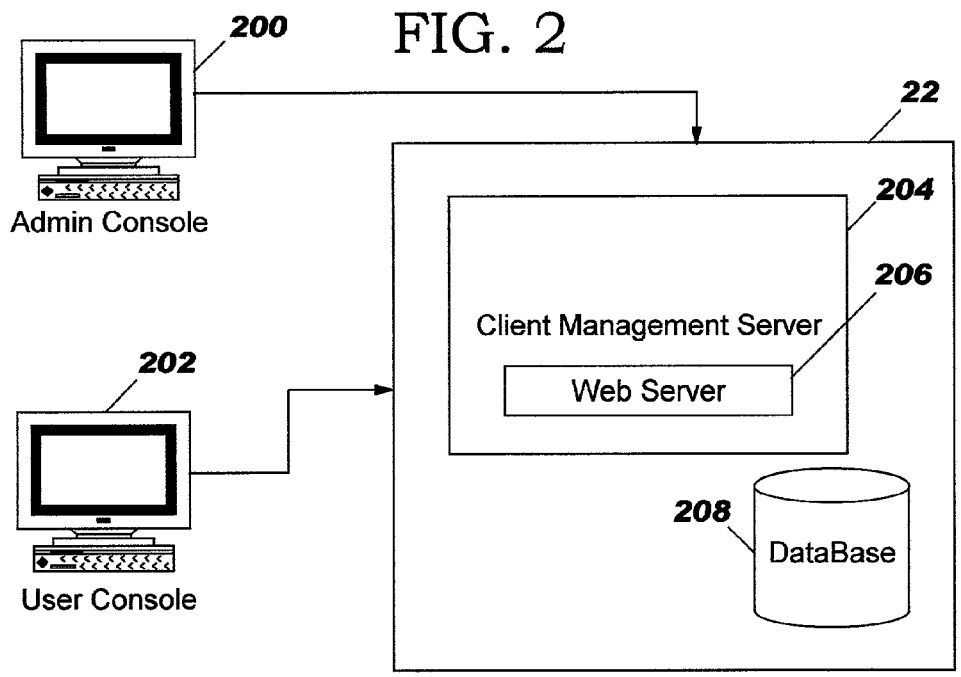
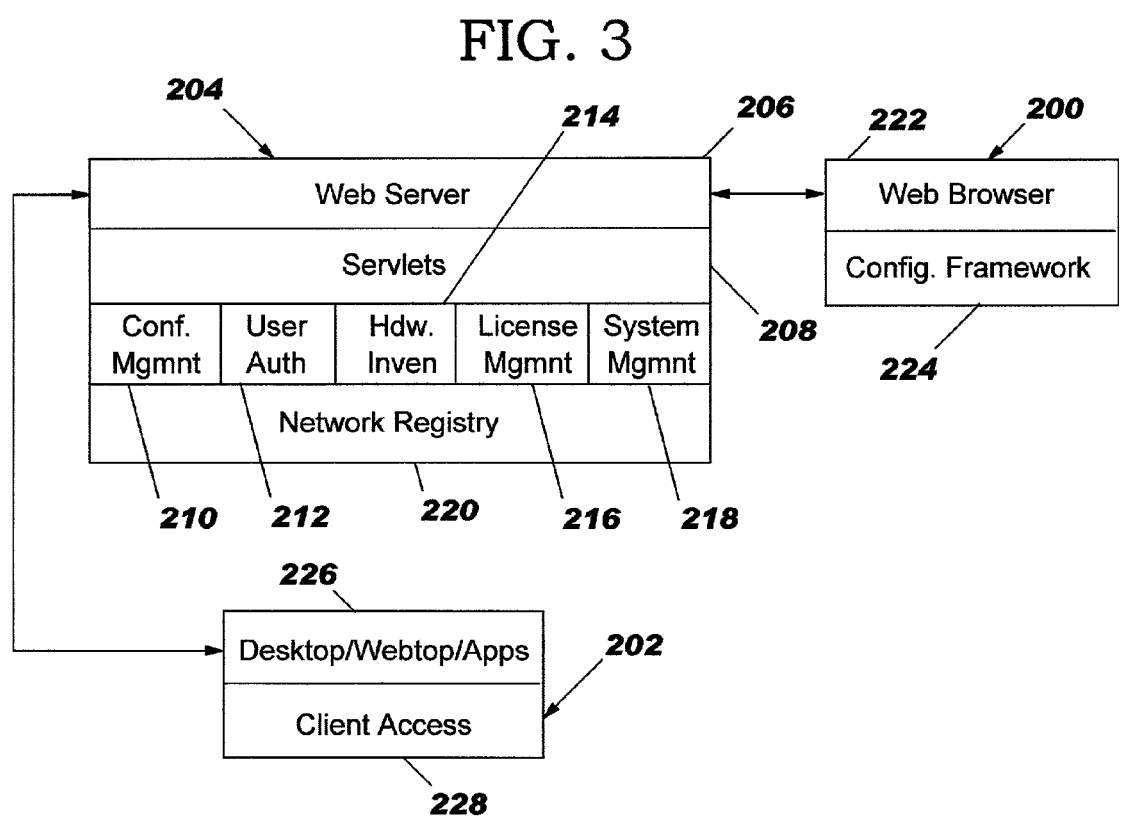

FIG. 9A
Create File Package Definition

- 130: Start Set Up Custom File Package Task
- 132: Enter file package
  - Source & Target
  - Before/After Pgm
  - Import txt/ID/PSW
- 134: Create File Package Definition? No → Terminate; Yes →
- 136: Does Source Dir Exist? No → Issue Error Message (138) → Terminate; Yes →
- 140: Any Import File Given? No → (skip); Yes →
- 142: Add PMImport Command Script To After List
- 144: Save File Package Definition → Terminate

FIG. 9B
Distribute File Package

- 150: Start File Package Distribution Task
- 152: Any Package? No → 154: Close The Task? Yes → Terminate; No → back
- 152 Yes → 156: Modify Package? Yes → 158: Save/Cancel File Package Changes
- 156 No → 160: Does Source Dir Exist? No → Issue Error Message (162) → Terminate; Yes →
- 164: Any Before Dist. Pgm? Yes → 166: Process Before Dist. Program; No →
- 168: Build Package and Distribute The File Package → A

FIG. 9C
Register Package Contents

- A → 170: Any After Dist. Pgm? Yes → 172: Process After Dist. Program; No →
- 174: Any Import file? Yes → 176: Call PMImport to Register Applet With Data Store; No →
- 178: Any Registration Error? Yes → 180: Issue Error Message → Terminate
- 178 No → 182: Refresh Open Applet Launcher? No → Terminate; Yes →
- 184: Refresh & Display Applet(s) on the Applet Launcher

METHODS, SYSTEMS AND COMPUTER PROGRAM PRODUCTS FOR DISTRIBUTION OF APPLICATION PROGRAMS TO A TARGET STATION ON A NETWORK

CROSS REFERENCE TO RELATED APPLICATIONS

This application is a divisional of application Ser. No. 09/211,528 filed Dec. 14, 1998 now U.S. Pat. No. 6,510,466. This application is related to the following application filed concurrently herewith: METHODS, SYSTEMS AND COMPUTER PROGRAM PRODUCTS FOR MANAGEMENT OF CONFIGURABLE APPLICATION PROGRAMS ON A NETWORK. This application is also related to U.S. patent application Ser. No. 09/072,597 filed May 5, 1998 and entitled: Client-Server System for Maintaining a user Desktop Consistent with Server Application User Access Permissions which is incorporated herein by reference in its entirety.

FIELD OF THE INVENTION

The present invention relates to network management in general and in particular to application program management on a computer network.

BACKGROUND OF THE INVENTION

Traditional mainframe computer configurations provided for user interface to the computer through computer terminals which were directly connected by wires to ports of the mainframe computer. As computing technology has evolved, processing power has typically evolved from a central processing center with a number of relatively low-processing power terminals to a distributed environment of networked processors. Examples of this shift in processing include local or wide area computer networks which interconnect individual work stations where each workstation has substantial independent processing capabilities. This shift may be further seen in the popularity of the Internet which interconnects many processors and networks of processors through devices such as, for example, routers. This type of network environment is often referred to as a client-server environment with client stations coupled to and supported by a server station.

In the modern distributed processing computer environment, control over software, such as application programs, is more difficult than where a mainframe operated by an administrator is used, particularly for large organizations with numerous client stations and servers distributed widely geographically and utilized by a large number of users. Furthermore, individual users may move from location to location and need to access the network from different client stations at different times. The networked environment increases the challenges for a network administrator in maintaining proper licenses for existing software and deploying new or updated applications programs across the network.

One approach to reducing software distribution and control problems is to use an application server in which the application programs are installed and maintained on a centralized server which supports a plurality of client stations (sometimes referred to as a client/server application as contrasted to a desktop application). In addition, the Systems Management Server (SMS) program from Microsoft Corporation provides an ability to transmit an application program from a server to a number of clients. The SMS system typically allows installation of programs and associated icons at client stations for SMS-enabled applications. A customized install generally must be created by a system administrator for each different version to be installed. Furthermore, once installed at a client, a user must typically use that specific client station. The application generally cannot be automatically deleted from the client station's desktop or automatically upgraded the next time the user starts the application. Similarly, the Tivoli Management Environment (TME) 10™ system from Tivoli Systems, Inc. provides a software distribution feature which may be used to transmit a file package to client and server stations on a network from a central Tivoli™ server.

A further complication in network systems is that, typically, these systems include combinations of network applications and native applications as well as combinations of different connection types and hardware devices. As used herein "native applications" refers to applications which are installed locally on a workstation such that characteristics associated with the native application are stored on the workstation. The combinations of network connections, differing hardware, native applications and network applications makes portability of preferences or operating environment characteristics which provide consistency from workstation to workstation difficult. Furthermore, differences in hardware or connections may create inefficiencies as users move from workstation to workstation. For example, a user may, in a first session, access the network utilizing a high speed connection and a workstation with a high resolution color monitor to execute an application and then, in a later session, access the network to execute the same application from a mobile computer with a monochrome display and a low speed modem connection to the network. Thus, session content, such as color display data or preferences associated with the application, which may have been appropriate for the first session may be inappropriate or inefficient in a later session.

Efforts to address mobility of users in a network have included efforts to provide preference mobility such as, for example, Novell's Z.E.N.works™, Microsoft's "Zero Administration" initiative for Windows® and International Business Machines Corporation's (IBM's) Workspace On Demand™. However, these solutions each typically require pre-installation of software at the workstation to support their services. For example, Novell's Z.E.N. and IBM's Workspace On Demand utilize a designer-supplied support layer in the operating system to enable their services. In addition to modifying the workstations operating system at startup to setup tasks to customize the user's environment, the Microsoft Zero Administration solution is typically limited to a homogeneous (Windows® only) environment where the workstation and the server are utilizing the same operating system.

Another approach to centralized management is the traditional mainframe model, such as with the IBM 3270 system, or an X Windows environment. However, in each of these approaches, the client device is treated as a dumb terminal with execution of the applications occurring at the server rather than the client. Accordingly, the communication between the server and the client is typically presenting characters for a display screen of the client and/or receiving key strokes from the client. Windows Zero Administration, as described above, is client rather than user oriented and installs applications on client stations which does not fully support roaming by users. The JAVA™ environment utilized on the Internet for web applications provides an ability for hardware independent application development but fails to provide an integrated framework for presenting multiple independent applications to a user. While various web applications, such as the Netscape Mission Control desktop, do allow personalizing of a specific application display by a user, this capability is generally not managed across applications for a user. Furthermore, it typically associates personalized screen information with an Internet address (and sometimes a "cookie" installed at the client) which is associated with a client device rather than a user, therefore limiting its ability to support roaming by users.

Each of these "mobility" systems typically do not address the full range of complications which may arise in a heterogeneous network utilizing differing devices and connections. The system typically will not present application choices associated with the user and for which the user is authorized but instead present information associated with the particular client workstation. Users would typically have to manually define session characteristics at each differing workstation they used in the network or maintain local characteristic definitions which may be inappropriate for particular applications a user is executing and may substantially reduced the administrative convenience of a centrally controlled network. Thus, these various approaches fail to provide a seamless integration of application access and session characteristics across heterogeneous networks. Such solutions may, at most, reduce network administration only after initial installation on each workstation. In addition, control over access by users is difficult to accomplish in a mobile environment.

Furthermore, these various approaches have, at most, only limited capabilities to provide a uniform framework for deployment of new or updated application programs from different software designers. To the extent software distribution capabilities from a central location are provided, such as with the TME 10™ system, they typically require various steps in the installation process to occur at different locations rather than allowing the entire process to be controlled from a single point for an entire managed network environment.

SUMMARY OF THE INVENTION

Accordingly, it is an object of the present invention to provide methods, systems and computer program products for centralized management of application programs on a computer network.

It is a further object of the present invention to provide such methods, systems and computer program products that are user based across various hardware interface devices.

It is another object of the present invention to provide such methods, systems and computer program products that provide for software deployment from a central administrative server location across a plurality of client stations.

It is a further object of the present invention to provide such methods, systems and computer program products that can accommodate various types of hardware operating under different operating systems across client stations.

These and other objects are provided, according to the present invention, by providing methods, systems and computer program products for management of application programs on a network including a server supporting client stations. The server provides applications on-demand to a user logging in to a client supported by the server. Mobility is provided to the user and hardware portability is provided by establishing a user desktop interface responsive to a login request which presents to the user a desktop screen through a web browser interface. The desktop accesses and downloads selected application programs from the server responsive to a request from the user, such as the selection of an icon associated with the application program which is displayed on the user desktop screen at the client. The application program is then provided from the server and executed at the client. The application program may further be customized to conform to the user's preferences and may also provide for license use management by determining license availability before initiating execution of the application program. Accordingly, applications are provided on-demand to users independent of the device used to access the server.

Centralized control of software distribution is also provided for a network management server managed computer network such as a Tivoli™ environment. Application programs are distributed as file packages (packets) to on-demand servers. A profile manager import call is included in the distributed file packet along with an import text file containing the data required to properly install and register the application program on the on-demand server and make it available to authorized users. Settable on-demand server identifier fields are included to allow a plurality of on-demand servers to receive a common file packet and properly install and register the program for use locally.

In one embodiment of the present invention, a method for management of application programs on a network including a server and a client is provided. A plurality of application programs are installed at the server. The plurality of application programs may be installed on a network drive accessible to the server. A login request initiating a session is received from a user through an application executing at the client. A user desktop interface is then established at the client associated with the user responsive to the login request from the user. The desktop interface includes a plurality of display regions associated with a set of the plurality of application programs installed at the server for which the user is authorized. The server receives a selection of one of the plurality of application programs from the user desktop interface and provides an instance of the selected one of the plurality of application programs to the client for execution responsive to the selection.

In a further embodiment, application management information for the plurality of applications is maintained at the server and a plurality of display regions associated with a set of the plurality of application programs for which the user is authorized is included responsive to the application management information. In a further embodiment of the present invention, application launcher programs associated with each of the set of the plurality of application programs for which the user is authorized are distributed to the client and selections of programs are received from one of the application launcher programs which is associated with the selected one of the plurality of application programs. The application launcher programs may be provided as JAVA™ applets and the user desktop interface may be provided as a web browser The application management information may include configurable user preference information for the plurality of application programs and a set of the configurable user preference information associated with the user and the selected one of the plurality of application programs may be provided to the client for use in executing the instance of the application program. The set of the configurable user preference information may include both user preferences configurable by the user and user preferences not configurable by the user which are configurable by an administrator. The user preference information may be updated responsive to updates from the user and the administrator respectively.

In another embodiment of the present invention, the user desktop interface is configured at the server responsive to an identifier of the user associated with the login request so as to provide a configured user desktop interface. The configured user desktop interface is then provided to the client for display. The user desktop may be configured not to include display regions associated with any of the plurality of application programs installed at the server for which the user is not authorized.

In another aspect of the present invention, a license availability is determined for the selected one of the plurality of application programs for the user. License availability for the user desktop application itself may also be determined. An unavailability indication is provided to the client responsive to the selection if the license availability indicates that a license is not available for the user. The license availability may be determined by the one of the application launcher programs associated with the selected one of the plurality of application programs which may obtain the license availability from a license management server. The license management server may run on the same machine as the on demand application server.

In a further aspect of the present invention, event logging information is received at the server from the instance of the selected one of the plurality of application programs. The server provides the received event logging information to a network management server associated with the server. In addition, event logging information may be provided to the user desktop application.

In yet another aspect of the present invention, methods are provided for distribution of application programs to a target station on a network from a centralized network management server coupled to the network. The application program to be distributed is provided to the systems (network) management server and a source directory and a target directory for distribution of the application program are specified. A file packet associated with the application program is prepared including a segment configured to initiate registration operations for the application program at the target station. The file packet is then distributed to the target station or stations. In one embodiment, the network management server is a Tivoli™ server. The segment configured to initiate registration operations may include an import data file and a call to an import program executing on the target station.

In one embodiment of the software distribution aspect of the present invention, the application program is provided as a JAVA™ applet and is registered based on a Universal Resource Locator (URL) address accessible to a browser application. The segment configured to initiate registration operations includes a variable field into which the target station inserts its identification during registration operations. The file packet may be distributed to a plurality of target stations each having an identification which may be inserted into the variable field at the target station.

While the invention has been described above primarily with respect to the method aspects of the invention, both systems and computer program products are also provided.

Accordingly, the present invention provides for management of application programs in a network environment from a central location while allowing for user preferences to be maintained independent of hardware location of the user along with centralized distribution of new and/or updated application programs. This provides for reduced costs and increased uniformity in deploying software in a network environment. It further provides an essentially hardware transparent ability for an individual user to interface to an on-demand server supported client station while maintaining the user's personal preferences for each application program.

BRIEF DESCRIPTION OF THE DRAWINGS

FIG. 2 is a schematic diagram of an on-demand server system according to an embodiment of the present invention;

FIG. 3 is a schematic diagram of the on-demand server system of FIG. 2 according to an embodiment of the present invention;

FIGS. 9A, 9B and 9C are flowcharts further illustrating operations for application program distribution and execution according to an embodiment of the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods, systems or computer program products. Accordingly, the present invention may take the form of a hardware embodiment, a software embodiment or an embodiment combining software and hardware aspects.

Figure 1:
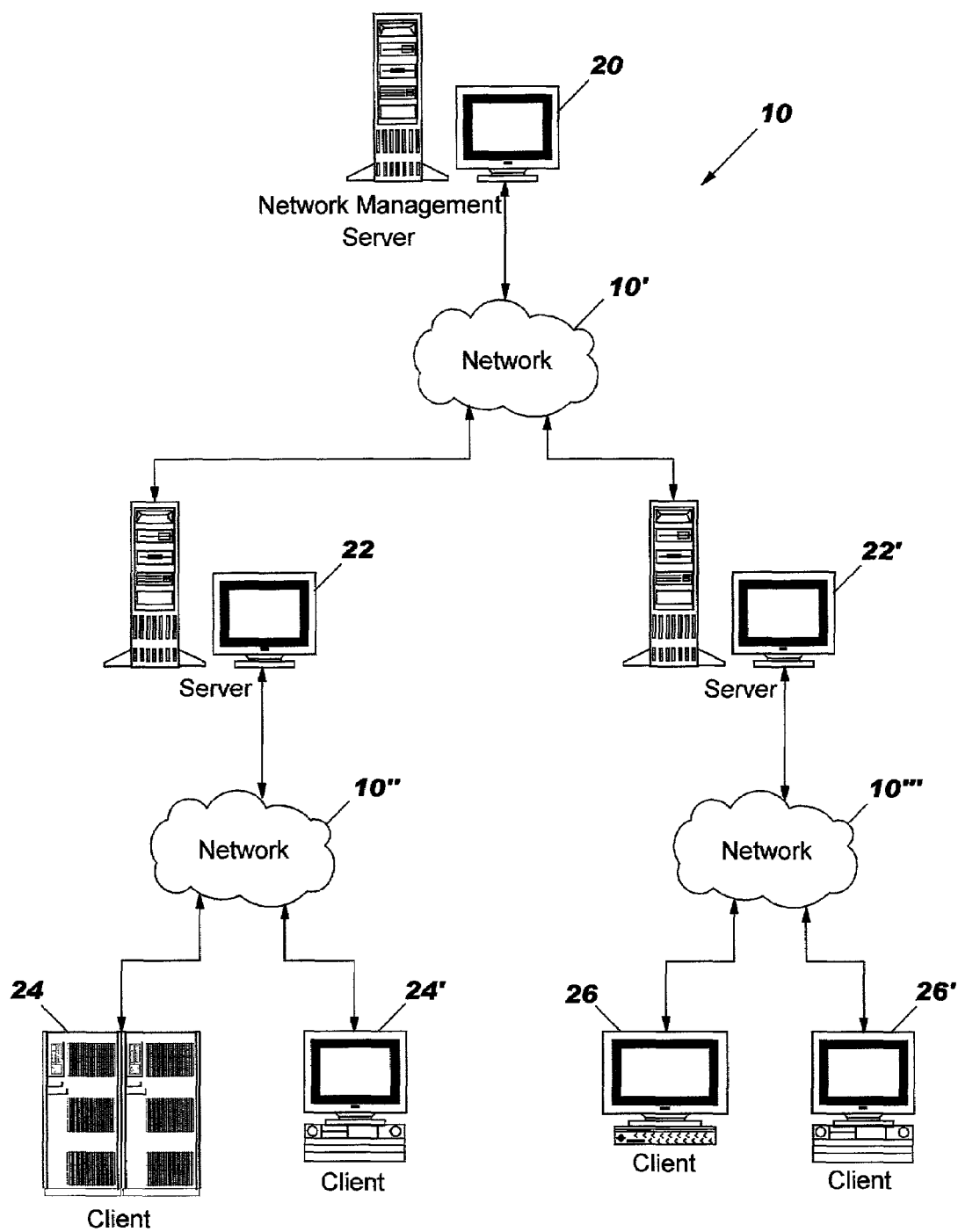
FIG. 1 is a schematic diagram of a computer network with application program management according to an embodiment of the present invention.

FIG. 1 illustrates an embodiment of a computer network including configurable application program management capabilities according to an embodiment of the present invention. Computer network system 10 includes a network management server such as a Tivoli™ server 20 and on-demand servers 22, 22'. As used herein, "on-demand" refers to a server delivering applications as needed responsive to user requests as requests are received. System 10 further includes client stations 24, 24', 26, 26'. As illustrated, on-demand servers 22, 22' are connected to Tivoli™ server 20 over a first network segment 10'. Client stations 24, 24' are served by on-demand server 22 and communicate over network 10". Similarly, clients 26, 26' are served by server 22' and communicate over network 10'". As schematically illustrated in FIG. 1, client stations 24, 24', 26, 26' may be a variety of different hardware operating a variety of different operating systems.

System 10, as illustrated in FIG. 1, is a centrally managed computer network with Tivoli™ server 20 acting as the central administration station executing network management software such as TME 10™ from Tivoli Systems, Inc. Servers 22, 22' act as on-demand servers for their respective associated client stations 24, 24', 26, 26' and provide for client/server application support. It is further to be understood that networks 10', 10", 10'" may be separate physical networks, separate partitions of a single physical network or may be a single network. Furthermore, Tivoli™ server 20 may be configured to allow for direct communication between server 20 and clients 24, 24', 26, 26'. In addition, a single machine may be configured to include a client, an on-demand server and/or a network (system) management server.

As will be described further herein with reference to the flowcharts, Tivoli™ server 20 provides a means for software distribution and management in computer network system 10. Furthermore, on-demand servers 22, 22' each provide an application management system for managing configurable application programs using both user and administrative preferences for various application programs. More particularly, as described in the embodiments herein, on-demand servers 22, 22' are configured to operate within the eNetwork™ environment available from International Business Machines Corporation (IBM). As will be further discussed herein, the present invention provides for an integration of an on-demand server as described herein in the IBM eNetwork™ environment with the TME 10™ system to provide for centralized control of software applications including the capability for supporting separate user and administration preference parameters. However, while the present invention may be implemented in the Tivoli™ environment, it is also suitable for use with other network management environments. Configurable preference management (and license use management) operations suitable for use with the present invention are described in U.S. patent application Ser. No. 09/211,529 entitled Methods, Systems and Computer Program Products for Management of Configurable Application Programs on a network, which is incorporated herein by reference in its entirety.

FIG. 2 illustrates an embodiment of an on-demand server according to the present invention. As shown in FIG. 2, the server system 22 of the present invention includes client management server 204 and access to a storage device for maintaining an application management database 208. While illustrated in FIG. 2 as an integrated part of system 22, database 208 may be a separate device so long as it is available to server system 22. In the illustrated embodiment which will be described herein, client management server 204 includes web server 206 providing an interface to an administrator user such as that illustrated by administrator console 200 and to users interfacing to the system through client stations such as the illustrated user console 202. Database 208 acts as a central repository of application management information, such as user, software, device, preference and access control information, responsive to client management server 204.

Client management server capabilities may be further broken down within client management server 204. For example, client management server 204, may be implemented in a JAVA™ environment with various applets or servlets where the term servlets generally refers to server-side JAVA™ programs each of which provides a particular function. For example, an application server servlet may control user application access through client management server 204 by receiving requests from web server 206. Various additional servlets could support controlling access to database 208, providing centralized preference management, centralized license use management and error logging and tracing.

User console 202 provides an end user client desktop. As will be described further herein, the desktop provides a task bar (to switch between active applications) and a launch panel with icons for the applications that the user is authorized to access. Pursuant to the control of client management server 204, the user desktop automatically provides icons for those applications that the user is authorized to use including automatically adding icons for new applications that the user is authorized to access when the new applications become available without any action required on the part of the end user.

Administrator console 200 provides a modified desktop interface for an administrator authorized user. The administrator desktop is preferably provided by a configuration management servlet which allows a user with administrative authority to modify system parameters and settings. Functions typically provided through the administrator console 200 could include adding or modifying users, user groups, software, customizing applications for users or groups, and granting or denying application access to certain users or groups.

Independent software designers provide various applications configured to benefit from the capabilities of server system 22. A software designer may utilize a particular version of server system 22 which includes a tool kit of functions for establishing preference management, license use management and error logging and tracing aspects unique to the specific application being provided by the software designer. The software designer utilizes the tool kit of functions in developing one or more JAVA™-based web applications (such as a word processor, emulator, calendar program, etc.) where the on-demand server tool kit functions expand the application's capabilities by allowing implementation of centralized preference storage and retrieval, centralized license tracking, and centralized error and event reporting, and centralized distribution for a particular application. For each application, the software designer preferably produces both an end-user application, used by typical end-users, and an administrative or configuration application, used only by administrators. The configuration application allows configuration of preferences that end-users will not be allowed to modify. The software designer also preferably provides a set of default preferences for each application so that the application is usable with or without any customization by administrators or end users.

A customer utilizing the server system 22 of the present invention may then purchase applications from software designers who have provided on-demand server capabilities in their applications. As will be further described with reference to the flowcharts, an administrator then defines users and groups of users that will have access to the applications installed on the server and installs the software defining it to the database 208 on server system 22. The administrator may also then perform any desired customization of preferences (using the configuration management application) for global defaults, specific groups, or specific users. The administrator further then may authorize certain groups or users to access the application. The database is updated so that when individual users next bring up their end-user client desktop, they will be provided an icon that may be used to launch the new application.

The application may also be provided the capability to retrieve its preferences (such as default fonts, target systems, screen colors, etc.) from the server database 208, register licenses through client management server 204 and log any error events through client management server 204. The administrator further can change preferences, monitor or enforce license usage, and diagnose errors for any user from the configuration management application executing on any support or client workstation such as console 200.

Administrator console 200 in the illustrated embodiment utilizes a JAVA™ capable browser, or desktop, for the user interface to interact with client management server 204. The configuration framework for the system, enabled by a JAVA™ applet, identifies manageable components, preferably utilizing a graphical tree representation of users/groups, application and machines. The administrator console 200 enables the definition and administration of users, groups of users, applications and machines. Once defined, users may be granted access to applications and the applications may be customized for user preferences, group preferences, and system-wide default preferences. Similarly, machine configurations may be defined for network computers and managed personal computers or other devices communicating over the network served by server system 22.

User console 202 provides client access services which provide an interface to request execution of instances of an application on console 202 whether it is a full function personal computing device or a network computer. Network computers functioning as user console 202 are initialized by configuring network access and then downloading a small kernel to initialize the operating environment of the network computer 202. The network computer machine environment is then further customized based on device configuration information provided by a client access services function. In a JAVA™ environment, the client access services function is preferably provided by a browser application presenting a user desktop window. The applications (and associated application launchers) are also provided as applets. It is further to be understood that, in the JAVA™ environment, currently available web browser applications are known to those of skill in the art which provide a user interface and allow hardware independent communication such as that currently specified by Internet protocols. Thus, the application launcher programs may be applets which display the icon which are associated with a web browser Universal Resource Locator (URL) which points to the location of the applet to be executed. Upon selection of the icon displayed by the application launcher, the selected application is "launched" by requesting the URL of the application from the on-demand server. Such requests may be made utilizing conventional Hyper-Text Transfer Protocol (HTTP) communications or other suitable protocols.

For both network computers or managed personal computers, once the machine environment is initialized, the user may log on to the network client management environment provided by server system 22 for authentication. User authentication allows the selection of the appropriate context (individual, group, default) for the desktop to be provided to console 202. For example, icon displays may be selected for inclusion in the desktop based on whether a particular user is an authorized user for the associated applications. In addition, any specific user preferences for the desktop interface (to the network management environment of the present invention) may be applied.

Referring now to FIG. 3, the network client management environment provided by server system 22 will now be further described. Client management server 204 provides for the centralized management of network client machine preferences, application access and application preferences. Software services, hosted by JAVA™ servlets operating on web servers, store and retrieve the management information requested by clients or administrators through the framework architecture as illustrated in FIG. 3. The framework architecture of the illustrated embodiment of FIG. 3 leverages JAVA™ servlets on the client management server 204 and JAVA™ applets and JAVA™ beans on the client interface in the administrator console 200 to maximize the ease with which new elements may be managed. Management information is maintained in database 208 through a network registry which may be based, for example, on the Lotus registry (single-server) or Lightweight Directory Access Protocol (LDAP) for a multiple-server environment, such as the IBM eNetwork™ Directory Server, to support the distributed capabilities provided by server system 22.

As shown in FIG. 3, communications with client management server 204 are provided through applications including web server 206 and, either directly or indirectly, with servlets 208. As illustrated in FIG. 3, there are 5 specific servlets performing different network management functions. The configuration management component 210 provides configuration tasks which are performed for users, machines and applications. For user and group support, configuration management component 210 preferably provides the ability to create, modify, and delete users and groups of users as well as the ability to configure services and preferences for users in groups. Machine support preferably includes the ability to configure preferences for client machines, groups of machines (optionally defined by profiles) and machine platforms (for example, network stations or network computers). Configuration management component 210 further provides login support for user authentication and mapping to a user profile and software support to configure the software (applets and applications) users and groups for access to and the user preferences for those software applications.

The configuration management component supports the configuration framework on the administration console 200 as well. This console provides a common, centralized user interface on which configuration management tasks for services for the particular server system 22 occur. When access to configuration management is provided through a JAVA™-enabled web browser, access to multiple servers is possible from a single administration station 200. The configuration framework 224 preferably minimizes the costs of administering services by maximizing the simplicity and consistency of the specific configuration tasks. The primary user of this component is typically the system administrator or others with administrator authority.

User authorization 212 provides control over which applications may be accessed by a particular user or group. User authorization component 212 preferably provides security by authenticating users securely rather than transmitting plain text passwords. Furthermore, client software may be provided with the ability to verify the integrity of applets delivered from the server to insure that they are free of viruses and have not been modified during delivery. Access to various application applets may be controlled, consistent with the permissions granted by administrators, using the configuration framework interface 224 at the administration console 200. Access to the server system 22 through configuration framework 224 may be limited to administrator authority users.

Hardware inventory component 214 provides for modification of applications as necessary to adapt to the type of hardware and/or operating system from which a user is requesting execution of an instance of an application (i.e. device specific characteristics). System management component 218 provides similar capabilities at a network management level. System management component 218 may further be provided to allow Tivoli™ ready system administration by acting as an agent to extend Tivoli™ management and control to clients supported by server system 22. As will be described further herein, integration may provide for software distribution, event logging support, remote operation and distributed monitoring through a network management server 20. Examples of systems utilizing operating environment information to establish preferences or modify content are described in U.S. patent application Ser. No. 09/211,675 entitled Methods, Systems and Computer Program Products for Management of Preferences in a Heterogeneous Computing Environment, and U.S. patent application Ser. No. 09/211,527 entitled Methods, Systems and Computer Program Products for Policy Based Network Control of Characteristics of User Sessions, which are incorporated herein by reference in their entirety.

Finally, license management component 216 may be utilized to monitor the usage of applications executing as JAVA™ applets to insure that the usage is within specified guidelines. The license management component 216 may be provided as a JAVA™ bean which provides status information to a license management JAVA™ servlet. The servlet then sends the appropriate management information to a license management server which may be integrated within server system 22 or maintained in a separate device. The license management component 216 thereby provides a convenient tool for tracking the usage of specified applications.

As also shown in FIG. 3, administrator console 200 includes web browser 222 and configuration framework 224. Web browser 222 provides a base for administrator console 200. Configuration framework 224 is preferably provided as a JAVA™ applet. The console 200 thereby provides a common, centralized user interface on which configuration management tasks for services for the particular server system 22 occur. As described previously, by providing configuration framework 224 interfacing through JAVA™-enabled web browser 222, access to multiple server systems 22 is possible from a single administration console station 200. Client interface 202 is similarly provided as a desktop interface on the user console regardless of device type. Similarly to administrator console 200, client interface 202 includes a JAVA™-enabled web browser or desktop 226 which provides, for example, an operating environment for network-client applications. A given user may, therefore, move among various machines so long as the console has access to the server system 22 which has the user's information. The available applications on the user desktop 226 are defined by system server 22 as described previously and will be further described with reference to the flowcharts. User console 202 preferably accesses client management server 204 using JAVA™ beans and/or Application Program Interfaces (APIs). Client access component 228 is preferably provided by JAVA™ beans and APIs within the framework of the network client environment provided by server system 22 allowing access to configuration information, license management and event logging.

Operations of the present invention will now be described with respect to the flowcharts of FIGS. 4 through 9C. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 4:
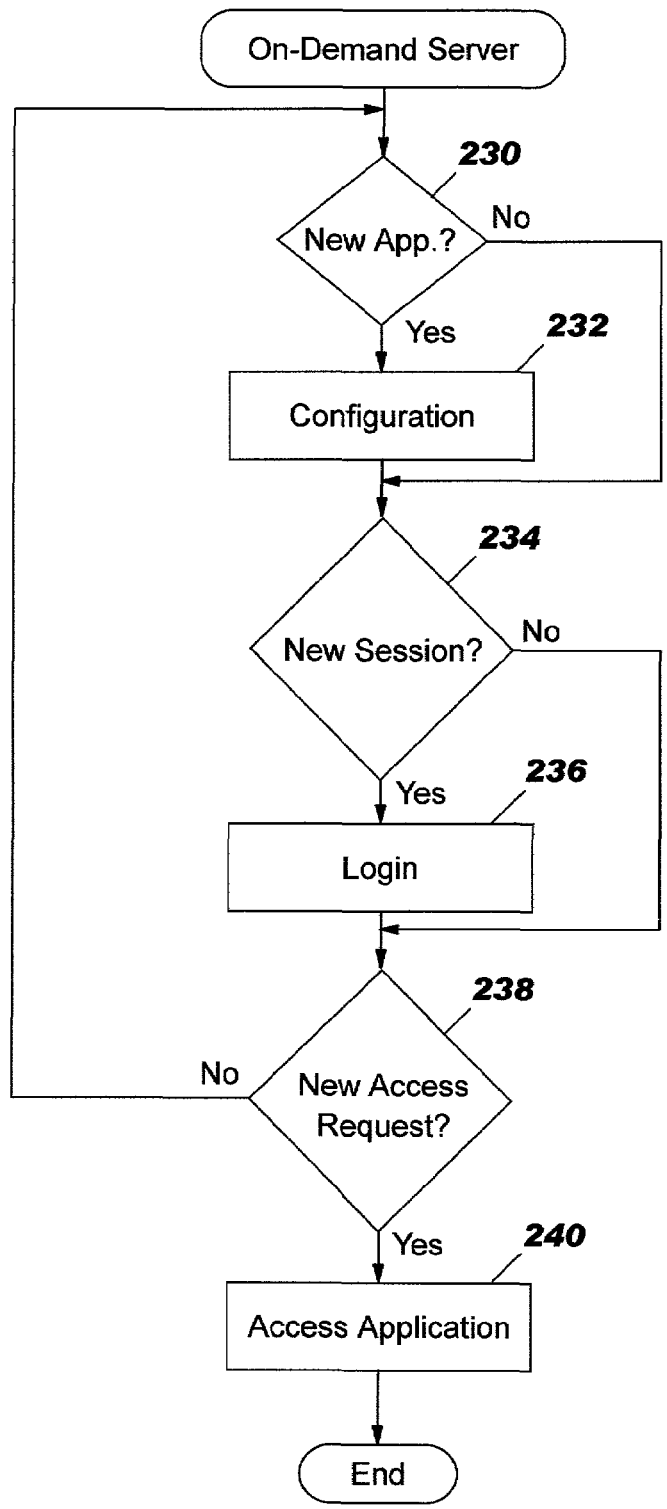
FIG. 4 is a flowchart illustrating operations for application program distribution and execution according to an embodiment of the present invention.

Referring now to FIG. 4, operations for on-demand server system 22 will now be further described. At block 230, server system 22 determines whether a new software application has been received for installation on server system 22. If so, configuration operations including setting up the users and software to be managed are executed (block 232). At block 234, server system 22 determines if a received request is the start of a new user session. Preferably, operations at block 234 are based on receipt at server system 22 of a communication from a client 202 which includes the user credentials from a login exchange performed locally at the client station.

In one embodiment of the present invention, the operations at block 234 are preceded by a user opening a browser at the client station and entering a designated URL associated with establishing a user desktop interface. The appropriate URL may be saved by the browser application using various techniques known to those of skill in the art. An application launcher associated with the user desktop interface is then downloaded to the client station and executed by the browser. The user desktop interface application launcher then obtains the user identification and password, either from a memory location or by prompting the user. Only a portion of the user desktop interface application launcher code need be initially downloaded sufficient to obtain the user information with additional associated code downloaded subsequently during establishment of the user desktop interface at the client.

If a user identification and password information is contained in the request at block 234, user login operations are executed including bringing up a user desktop and establishing the user's credentials and application access authorization, based, for example, on stored ID and password information (block 236). Additional session information may be determined from the login operations such as configuration information related to the hardware and operating system in use for the session. Finally, if it is determined that the request has been received from an already logged in user at block 238 requesting execution of an application (as opposed to initial setup of a user desktop interface) application access management operations are executed to bring up an instance of the managed application for the user (block 240).

Figure 5:
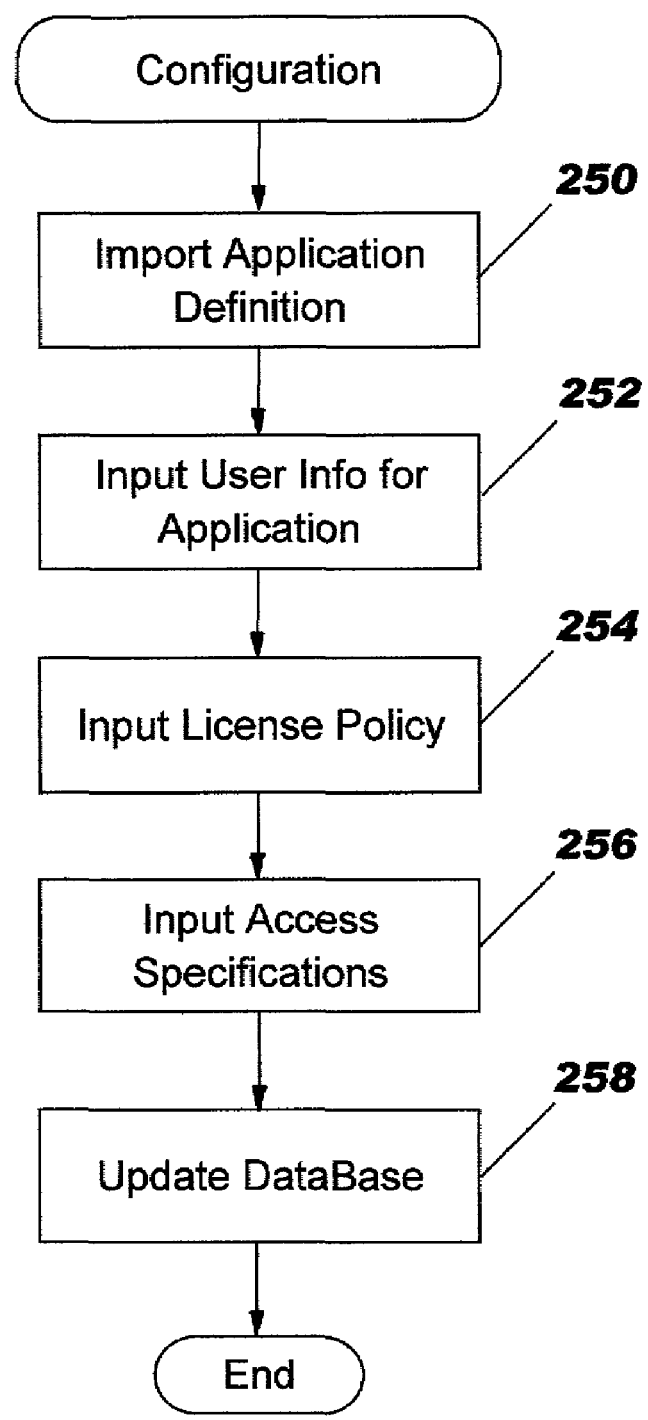
FIG. 5 is a flowchart illustrating configuration operations for application program distribution and execution according to an embodiment of the present invention.

Referring now to FIG. 5, configuration operations from block 232 will now be further described. To implement a new or updated software application, server system 22 accepts definitions of the application that describe the location and description of the application. This information may be provided by an import file containing location information such as path directories and file name definitions. The server system 22 further accepts definitions of users and groups that will access the system and the specific application (block 252). This information similarly may be provided as an import file or entered by a user with administrator authority. In addition, in the illustrated embodiment of the present invention, server system 22 also accepts license policies describing the licensing characteristics for the new application (block 254). The server system 22 further accepts control specifications defining which users and groups are authorized to access the new or updated application (block 256). License policy and control specifications may be obtained from an administrator at console 200 or obtained as an import file. Finally, server system 22 updates database 208 to maintain the input definitions and specifications for the new or updated application in a format accessible to server system 22 (block 258).

Figure 6:
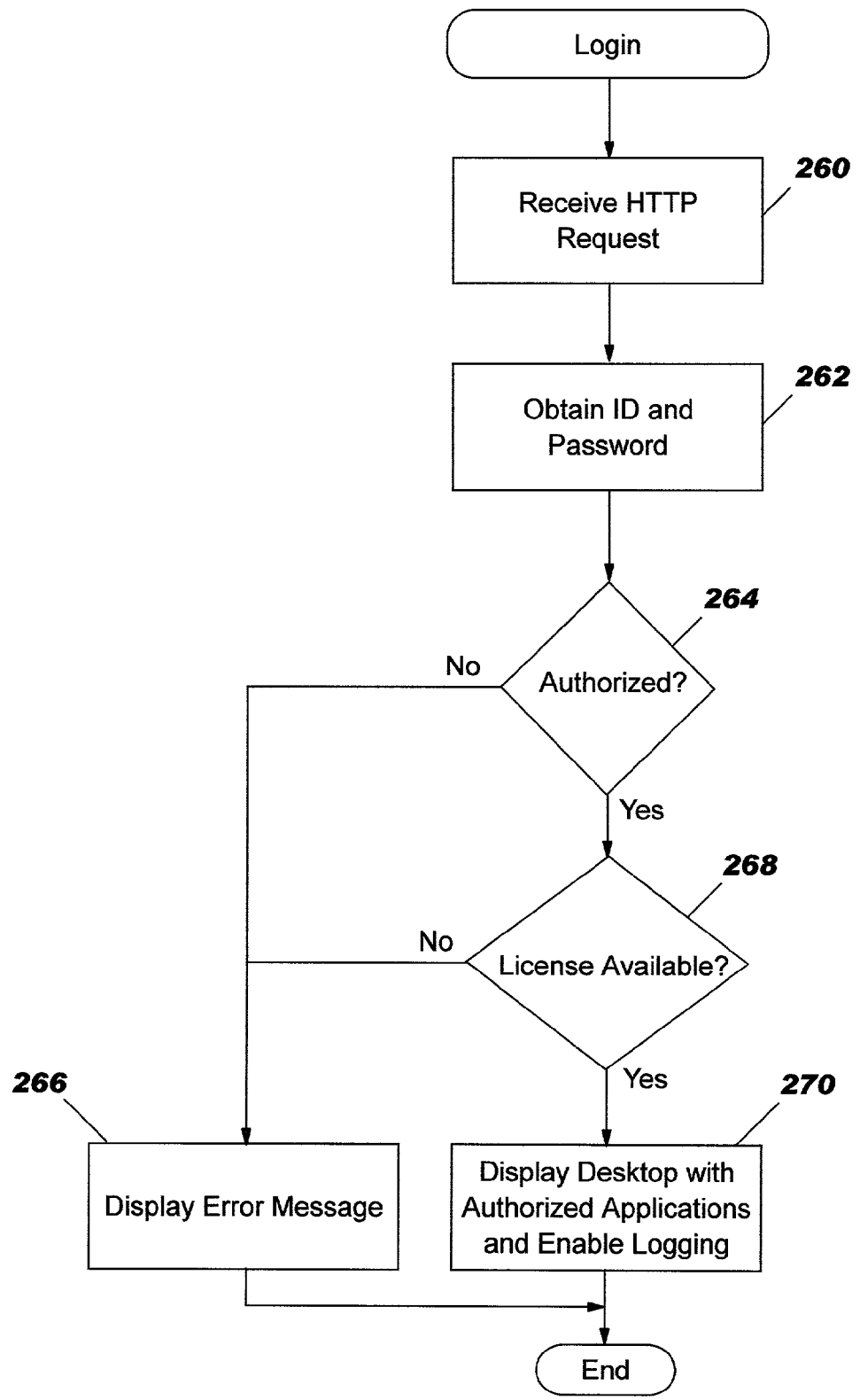
FIG. 6 is a flowchart illustrating user login operations for application program distribution and execution according to an embodiment of the present invention.

Log in operations from block 236 of FIG. 4 will now be further described with reference to the embodiment of the flowchart of FIG. 6. The server system 22 receives a request to initiate a user desktop interface from a user console 202 as described above for an embodiment of the operations of block 234 (block 260). In other words, in the JAVA™-based embodiment described above, an HTTP request may be received by server system 22 requesting that a desktop instance be executed for a user at user console 202. Note that the desktop application itself may be structured and provided as a pre-defined application which has the same managed characteristics as any other application provided in the network management environment supported by server system 22.

On receipt of a request to initiate an instance of a desktop application, the server system 22 first confirms that identification and password information is available (i.e., that the user successfully previously logged on and provided the appropriate information previously or included the information in the request). If the appropriate identification is not available, server system 22 obtains an identification and password from the user for use in establishing the authorization credentials of the user (block 262). Alternatively, in another embodiment, the application launcher code at the client may only communicate a request if a user identification and password have been successfully obtained, thereby not requiring the operations of block 262. At block 264, the server system 22 checks the user's credentials to see if the user is authorized to bring up the user desktop interface application, preferably using the same authorization and checking procedures as used by any other managed application as described in U.S. patent application Ser. No. 09/211,529.

If the user is not authorized at block 264, an error message is displayed and processing stops (block 266). If the user is authorized, server system 22 processes a license request to determine if a license is available for the desktop application (block 268). If no license is available at block 268, an error message is displayed and processing stops (block 266). If a license is available, the server system 22 displays the desktop framework 226 (FIG. 3) suited for the particular user and hardware device being utilized by the user and further determines what other applications the user is authorized to access and puts an icon for the authorized applications on the user's desktop display (block 270). In addition, error and trace log entries associated with the desktop application may be enabled for logging and receipt by the server system 22 (block 270).

While, as described above, operations were identified as being performed at server system 22, it is to be understand that functions may be divided differently between server and client according to the teachings of the present invention. For example, the user desktop interface application launcher at the client may, responsive to the request to initiate a session, be provided the desktop application program code and the appropriate code to obtain preferences and license availability information. The operations as described for FIG. 6 may then be executed, in part, at the client, and in part at the server where the data base containing preference information and, optionally, license information is preferably maintained. Accordingly, it is to be understood that the preference and license information are preferably obtained by the application launcher which further includes the application program itself for execution at the client. As with the initial split in downloading code, the code for obtaining preference and license information may be separately downloaded before the code for the application program itself.

As used herein, the term "application program" generally refers to the code associated with the underlying program functions, for example, Lotus Notes or a terminal emulator program. However, it is to be understood that the application program will preferably be included as part of the application launcher which will further include the code associated with managing usage of the application program on a network according to the teachings of the present invention. Further it is to be understood that, as used herein, the term "application launcher program" may refer to the entire program provided by a software vendor or to merely a portion thereof distibuted to a client to perform particular operations. For example, the application launcher program distributed to initially populate the user desktop preferably does not include the code associated with the underlying application program and obtaining preferences which may only be distributed to the client later when execution of the application program is requested. The application launcher program distributed to populate the user desktop may only include a URL and an associated ICON and, possibly, code to allow obtaining of user identification and password information. Memory usage on the client stations may thereby be limited.

It is to be understood that, while the discussion herein is generally provided with reference to a single application program, the present invention is directed to management of a plurality of application programs available on a network including a server and a client. Accordingly, the plurality of application programs is installed and accessible at the server system 22. A user desktop interface is then established at the client which is associated with the requesting user responsive to a login request from the user. The desktop interface includes a plurality of display regions, such as icons, associated with a set of the plurality of application programs installed at server system 22 for which the user is authorized. The determination of which of the plurality of applications a user is authorized for may be based upon application management information for the plurality of applications maintained at server system 22.

Desktop display operations may be coordinated between system server 22 and client station 202. The user desktop interface is preferably configured at the server system 22 responsive to an identifier of the user associated with the login request so as to provide a configured user desktop interface. It is this configured user desktop interface which is directed to a requesting user and presented in a form appropriate for display by the client station 202 from which the user is accessing the server system 22. Furthermore, as the desktop application itself may be provided as an application launcher applet like any other application using the methods of the present invention, the desktop itself may also be configured to include user preference characteristics unique to the user where it is desired to have user configurable characteristics for the desktop interface.

Preferably, access control to applications is provided by not including display regions associated with any of a plurality of application programs installed at the server system 22 for which the user is not authorized. In other words, a user logging in to system server 22 will be provided a user desktop for display which only includes icons for those applications for which the user is authorized. This same configuration grouping may be provided regardless of the client station 202 on which the user is accessing the system.

Figure 7:
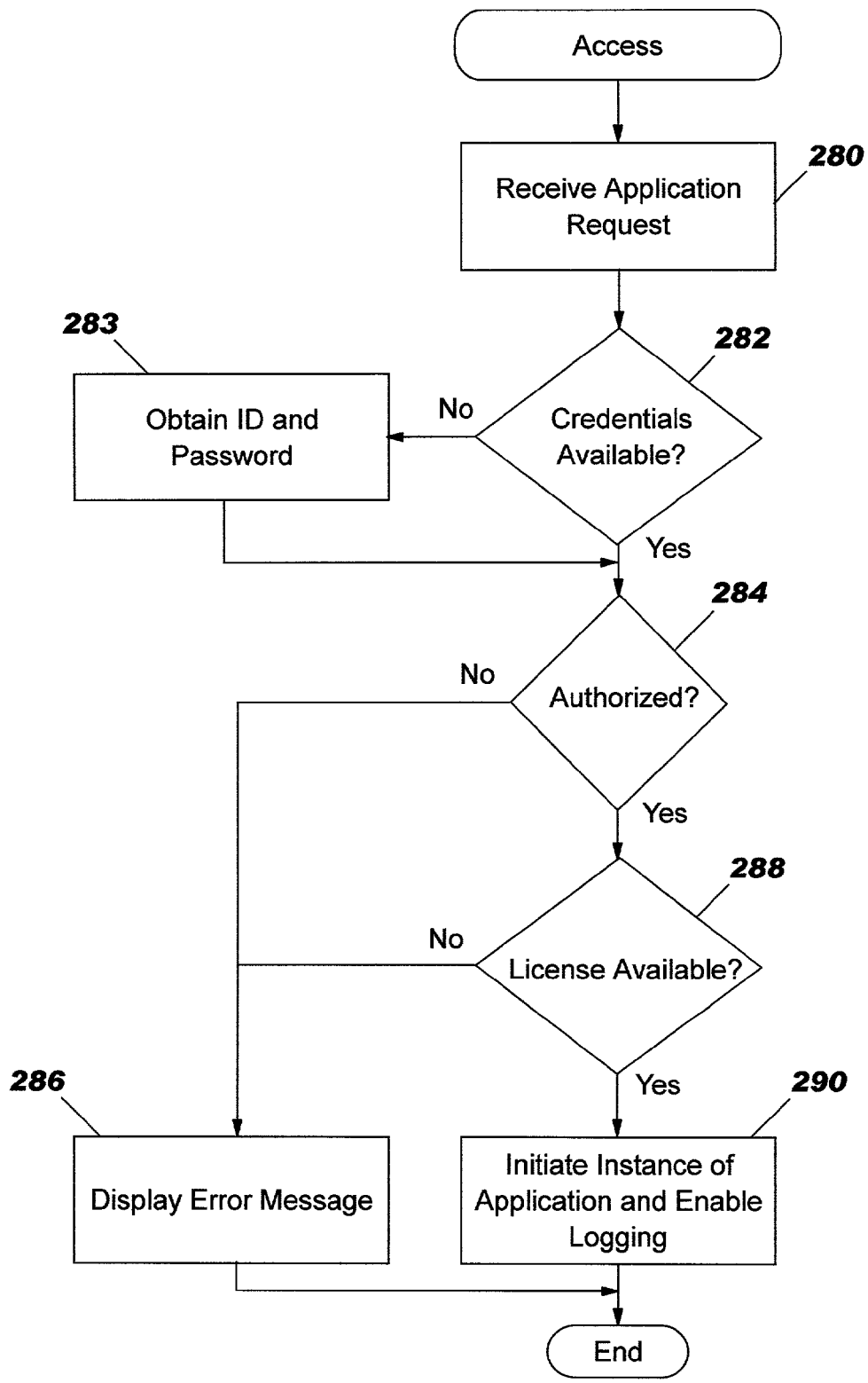
FIG. 7 is a flowchart illustrating application access operations for application program distribution and execution according to an embodiment of the present invention.

Referring now to FIG. 7, application access operations from block 240 of FIG. 4 will now be further described for a particular embodiment of the present invention. The server system 22 receives a request to initiate execution of an instance of a managed application from a user (block 280). This may be provided, for example, by a user clicking on an application icon on the user's desktop 226 (FIG. 3). The server system 22 then checks to determine if the user identification information is available (i.e., if the user has successfully logged on and provided the appropriate identification information) (block 282). If not, server system 22 obtains the user's ID and password and establishes the credentials of the user for use in authorization determination (block 283). It is to be understood that, where the user brought up the desktop application, the system typically will have already requested and obtained the user's credentials.

At block 284, the server system 22 checks the credentials of the user to determine if the user is authorized to access the requested application. If the user is not authorized for the particular application an error message is displayed and an error code is returned to the application (block 286). Optionally, the application program may be configured to allow it to proceed with executing an instance of the application but the application will typically not be authorized to use system level services of the system server 22 (such as error logging, retrieval of user preferences or requesting a license) where the database 208 indicates to the server system 22 that the identified user is not authorized to use the application. In other words, client management server 204 may be configured, based upon the properties provided by a software designer for a particular managed application, to initiate execution of an instance of an application by a non-authorized user while otherwise denying access to the application management capabilities supported by client management server 204.

Furthermore, it is to be understood that the application launchers for individual application programs are preferably distributed when the user desktop is initiated (populated) and may only contain code required to obtain user preferences and/or license information and the application program's executable code from the server on-demand (i.e., when execution is requested by a user). This minimizes the memory required at clients 24, 24', 26, 26'. Alternatively, the application launcher may contain, at the client, all the executable code comprising the application program itself before execution is requested. As the application program supported by server system 22 may be executable via a variety of users concurrently, server system 22 provides an instance of the selected one of the plurality of application programs to populate the application launcher to client station 202 for execution responsive to a selection of the application program from the user. Alternatively, while it is not a preferred approach, the application program code itself may be included in the application launcher at the time the user desktop interface is populated allowing an instance of the application program to be executed with less communication traffic between the network and the server associated with the request to initiate an instance of the application program.

Preferably, the application launcher program, as described above, is distributed for each authorized application program to the client station 202 at the time of establishment of the user desktop interface without including all of the executable code of each application as part of the application launchers at the time of distribution. The application launcher applet then detects selection by the user of the application program's associated icon from the user desktop interface at client station 202 and requests an instance of the selected one of the plurality of application programs associated with the icon from server system 22. The application launcher program then populates client station 202 with the instance of the selected application program for execution. Preferably, the appropriate configurable user preference information for the selected application program is also obtained from the server system 22 for use in executing the instance of the application program at the client station 202.

The user preference information is provided to client station 202 from server system 22 for use in executing an instance of the application at the client station 202. The configurable user preference information maintained by server system 22 may include both user preferences configurable by the user and those not configurable by the user which are instead configurable by an administrator. The user preferences may further be updated responsive to changes from the user or administrator. Configurable preference management operations suitable for use with the present invention are disclosed in U.S. patent application Ser. No. 09/211,529.

If the requesting user is an authorized user for the requested application, the server system 22 accepts a license request from the application (block 288). If no licenses are available, the system may be configured to provide an error message display and stop processing (block 286). The error message may take the form of an unavailability indication provided to client station 202 if the license availability information obtained from a license management server, which may be system server 22 or other another server on the network, indicates no licenses are available for the requesting user. If a license is available, an instance of the requested application is executed and error and trace logging operations are enabled to receive error and trace log entries if they are sent from the application (block 290). Server system 22, as described previously, may be configured to operate in a Tivoli™ environment and forward error and trace log entries to the Tivoli™ enterprise management system 20.

As will be understood from the above description, the present invention allows development and deployment of managed applications which are deployed to servers rather than to individual clients. Furthermore, the applications are defined and access is controlled centrally which provides control over various versions of software so that the latest software may always be served on-demand to the end-users. Furthermore, users and user groups may be managed centrally allowing users to roam from client station to client station while still maintaining the same desktop, application access and preferences. Application preferences themselves may be managed centrally for users and groups of users. Various applications can be created using the appropriate tool kit capabilities to provide for centralized preferences, license use management and tracing and error logging. Furthermore, the applications (including the configuration tool kit elements) may be delivered in a platform independent format and run on JAVA™-enabled browsers. In addition, as the desktop interface 226 is managed like other applications, all available and authorized applications may be provided by sharing a single login with a desktop application. Security may also be provided through application management without requiring a secure domain in the web server.

The end-to-end software distribution aspect of the present invention will now be described further with reference to FIGS. 8–10. As will be described, the present invention provides for distribution of a new application program to a number of users in an organization using an automated process for distributing programs, preferably as JAVA™ applets, to a set of workstations such as the on-demand servers 22, 22' discussed previously. More particularly, the invention will be described with respect to its application and implementation using a specific network management approach provided by Tivoli Systems Inc. referred to as the Tivoli Management Environment™. However, it is to be understood that the benefits of the software distribution aspects of the present invention may be provided with any network management application having the ability to pass file packets including the ability to commence initiation of operations on a remote workstation by information included in the distributed file packet.

In the case of the Tivoli™ environment, the TME 10™ package provides server and client software for distributing a software package from a server to a list of Tivoli™ clients. TME 10™ further provides the ability to run pre- and post-processing commands during the software distribution process. Furthermore, the servers receiving distribution of the application from the Tivoli™ server are provided with an on-demand server application, such as that previously described with respect to the user preference aspects of the present invention, which application includes the ability to import the necessary definitional information and create the appropriate files to install and register a transferred file packet containing an application program on the local server in a manner which makes it recognized and available to users at clients served by the server. For example, the PMImport applet of the eNetwork On-demand server (version 1.0) from IBM supports such a capability.

Figure 8:
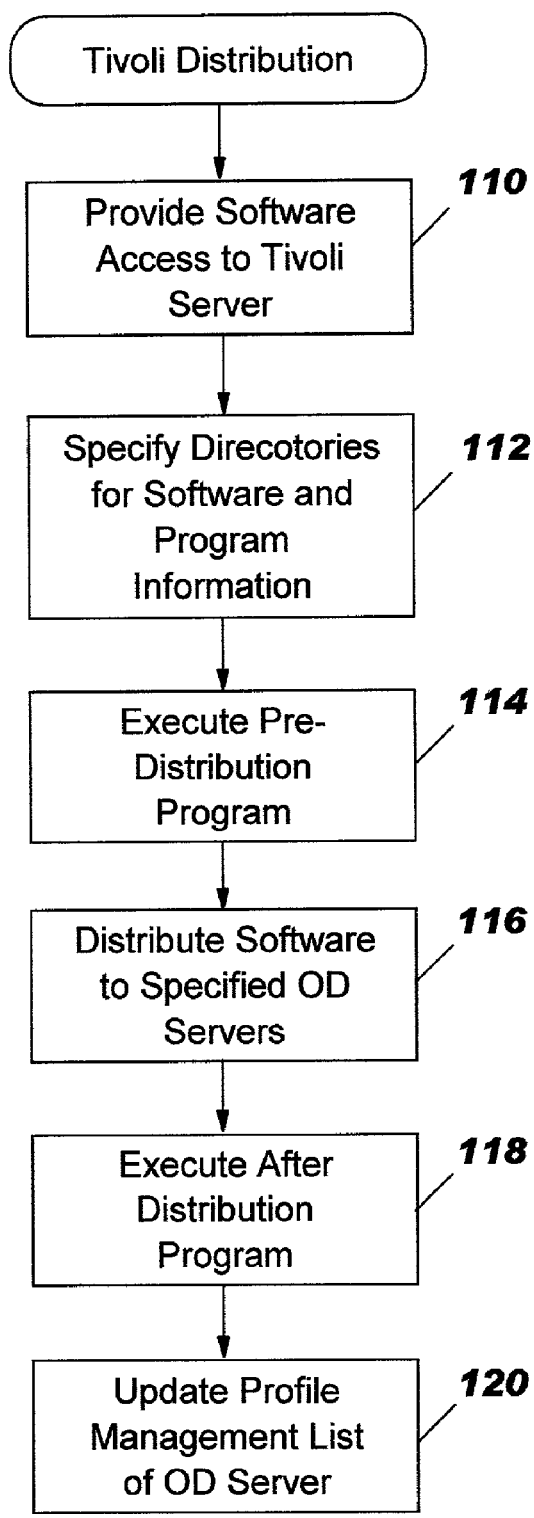
FIG. 8 is a flowchart illustrating operations for application program distribution and execution in a network management server environment such as a Tivoli™ environment according to an embodiment of the present invention.

As illustrated in the embodiment of FIG. 8, operations begin when the application software to be distributed is placed by a system administrator on a disk or storage device accessible by Tivoli™ server 20 (FIG. 1). As will be described further with reference to FIGS. 9A–10, the application program source and destination locations are specified at block 112. A pre-distribution program is executed at the Tivoli™ server 20 if such a program has been specified (block 114). The application program software is then distributed by Tivoli™ server 20 to specified on-demand servers 22, 22' at block 116. In addition, the destination servers 22, 22' may be provided user identification and password information controlling access to the application program and any supporting database and may further be notified as to which end users and/or clients 24, 24', 26, 26' should be given access to the application program.

The software distribution operations at block 116 may be accomplished using the software deployment capabilities, for example, of the TME 10™ package. Any specified after-distribution programs are executed as illustrated at block 118. Typically, the after-distribution program is a program located on a directory at the target on-demand server 22, 22' which is executed at the target server. At block 120, the on-demand server 22, 22' updates the appropriate file and configuration information to make the new application program available to users. For example, on-demand server 22 may be configured to maintain a profile management list identifying various application programs available for execution by users at client stations 24, 24' including a designation of which applications are authorized with respect to individual users. Optionally, hardware client device associated designation and preferences could be provided. These user and/or client associated profile management lists may then be updated by on-demand server 22 to include the new application program (block 120). Accordingly, when a user subsequently communicates from a client 24 to server 22 (typically through a browser application as described above) an icon will appear in the user's graphic interface which the user may then select to initiate program execution. The new application software package is therefore installed and ready for use on each designated on-demand server 22, 22'.

Accordingly, with a request from a single Tivoli™ server 20 location, an administrator both sends a new application package to all supported on-demand servers and installs the program and configures (registers) it to be available for use. This may be accomplished without requiring any administrator log-in or operations at the individual on-demand servers 22, 22' or client stations 24, 24', 26, 26'.

Operations as described with reference to FIG. 8, will now be further described for a particular embodiment with reference to FIGS. 9A–9C and 10. Operations related to creating a file package definition (corresponding to block 112 of FIG. 8) will first be described with reference to FIG. 9A. At block 130, the custom file package set up task is initiated. At block 132, the file package name and source and target directory paths are specified as well as the before and after programs and any import file definitions.

Figure 10:
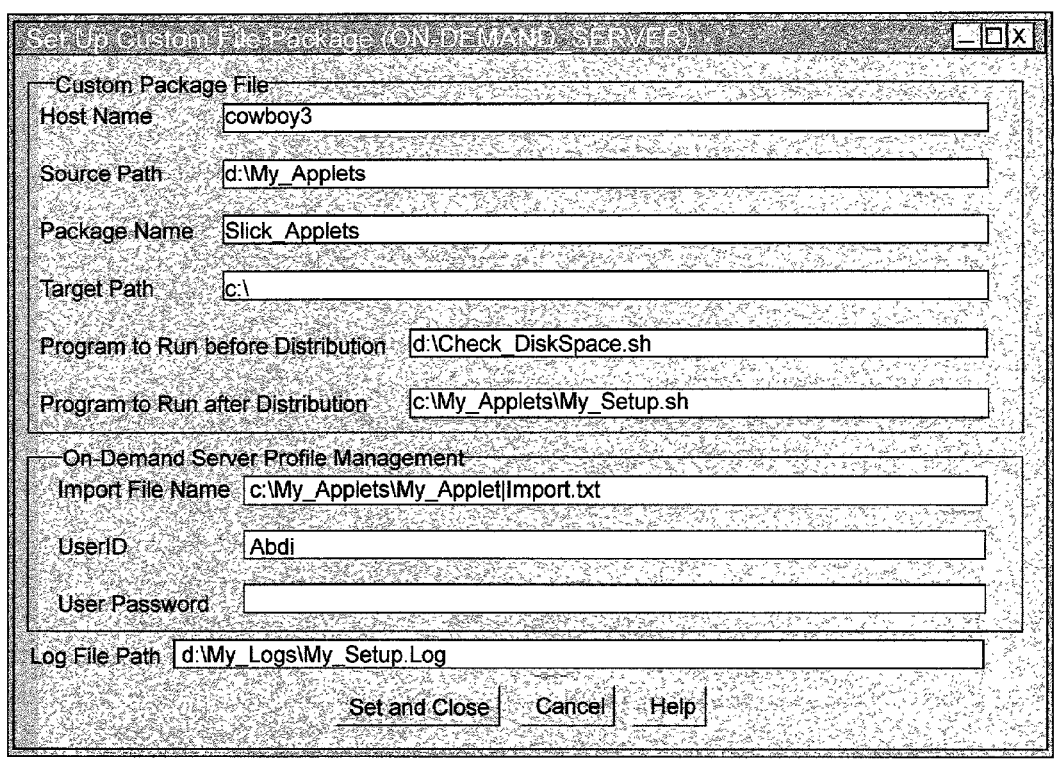
FIG. 10 is an illustration of an interface screen used in centralized software deployment according to an embodiment of the present invention.

Operations at block 132 may be further understood by reference to the example input screen for entering file package information shown in FIG. 10. As shown in FIG. 10, the host name specifying the Tivoli™ server 20 having access to the file package (configurable application program) is specified as "cowboys3." The source path is designated as "d:\My_Applets" which designates, for example, a CDROM drive connected to Tivoli™ server 20. A name is provided for the file package to be distributed which in FIG. 10 is "Slick_Applets." The target path specified in FIG. 10 is "c:\." This refers, for example, to the hard disk storage device. It is to be understood that the target path destination refers to a directory path on a receiving device which will be used for software package delivery at each of the selected target on-demand servers 22, 22' receiving distribution of the custom file package.

In FIG. 10, both a program to run before distribution (d:\Check_DiskSpace.sh) and a program to run after distribution (d:\My_Applets\My_Setup.sh) are specified. As discussed previously, the Program to Run before Distribution entry identifies a path located on the host Tivoli™ server 20 and the Program to Run after Distribution entry specifies a path on the receiving on-demand server 22 22'. Accordingly, the My_Setup.sh program should either be installed on each of the target on-demand servers in the designated directory or be included in the distributed software package.

In the example of FIG. 10, an import file name (c:\My_Applets\My_Applet_Import.txt) is further provided to allow for automatic installation and registration of the new application program at each of the target on-demand servers 22, 22'. As discussed previously, user ID and password information are also available to limit execution of programs on the target on-demand servers 22, 22' to administrators who have authority to initiate execution of such programs. The last row of FIG. 10 illustrates a log file path designation (d:\My_Logs\My_Setup.Log) allowing Tivoli™ server 20 to track the results of a software distribution operation including detecting any errors in distribution.

Referring again to FIG. 9A, if any problems were encountered in creating the file package definition at block 134, operations terminate. Otherwise, at block 136, Tivoli™ server 20 determines if the source directory exists. If not, an error message is issued at block 138.

At block 140, Tivoli™ server 20 determines if an import file name has been specified such as the Import.txt file identified in the example of FIG. 10. If so, at block 142, a PMImport command script is added to the package of information to be distributed to the target on-demand servers 22, 22'. As discussed above, the PMImport command script is a particular technique for supporting execution of installation and registration operations by on-demand servers 22, 22' supported by the On-Demand Server™ from IBM by importing the definition of the distributed software applets, as defined in an import file, into the profile manager of an on-demand server 22, 22' and registering the applets for use by authorized users. However, it is to be understood that the benefits of the present invention may be provided with client/server application environments based on other operating protocols. Finally, at block 144, the created file package definition is saved by Tivoli™ server 20.

Referring now to FIG. 9B, file distribution operations from blocks 114 and 116 of FIG. 8 will be further described. At block 150, the file package distribution task is commenced at Tivoli™ server 20. If there are no packages to distribute at block 152 and a request to close the task has been received at block 154, operations terminate. Otherwise, operations loop back to block 152 until a package is available for distribution. When a package is available for distribution, the administrator is prompted at block 156 to determine if any changes are desired in the file package before distribution. If so, any modifications are performed and saved at block 158. At block 160, Tivoli™ server 20 again tests to determine if the designated source directory from the file package definition exists and, if not, issues an error message at block 162 and terminates file package distribution operations.

At block 164, Tivoli™ server 20 determines if any before distribution program has been designated and, if so, processes the before distribution program at block 166. A before distribution program may be provided and executed at block 166 for a variety of reasons. For example, Tivoli™ server 20 may check for space availability on the storage devices on the target on-demand servers 22, 22' to insure that sufficient space is available to accept distribution of the file packet before transmission. Tivoli™ server 20 could further check to insure that the required environment for distribution exists on the target on-demand servers 22, 22'. For example, different versions of the application launcher applet and configuration manager applet for a given application program may be provided for different types of hardware or operating systems to insure that the preferences included are suitable for the target environment. The file package is then built and distributed to the specified target servers 22, 22' at block 168.

Referring now to FIG. 9C, operations at the recipient on-demand server 22, 22' from blocks 118 and 120 of FIG. 5 will be further described. At block 170, the recipient on-demand server 22 determines if any after distribution program has been designated by the file package. If so, the after distribution program is processed at block 172. Various installation, authorization, customization or clean up operations may be provided depending upon the client/server and network management software which is installed and operational at the on-demand server 22. At block 174, on-demand server 22 determines if an import file name has been designated and, if so, executes the necessary code to register the application program at block 176. For the illustrated example, this is accomplished by a call to PMImport to update the profile manager list of on-demand server 22. Appropriate information associated with the application program being distributed to support the profile management function of on-demand server 22 associated with the application program being distributed should be included in the transmitted import file for automatic operations to occur properly. For example, with the IBM On-Demand Server™, the import file should include the name to be displayed in the on-demand server configuration tree and the URL of the applet. Additional optional information may be included in the import file such as a URL identifying icons for display, common fields, access control information and class information where appropriate.

As can be seen from the example of FIG. 10, the designated Import.txt file is on a path previously designated for the transfer of the file package (the c:\My_Applets directory). Therefore, it is to be understood that the file package downloaded from Tivoli™ server 20 should not only include the application launcher applet and the configuration management applet but the My_Applet Import.txt file as well. Otherwise, the PMImport call may not be able to find the designated file in the appropriate directory.

At block 178, on-demand server 22 determines if any registration error was encountered and, if so, issues an error message at block 180 and terminates operations. If refreshing of the application launcher is not required for the particular file package distribution at block 182, operations for registration terminate successfully. Otherwise, at block 184 the application launcher applet is refreshed and displayed at block 184 before termination of package registration operations.

Refreshing and displaying operations may include importing the software applets and registering them to be immediately available to users. The applet launcher may be refreshed, for example by pressing the Refresh button or automatically without user input, to display the newly registered application icons. Old icons may be deleted and new icons may be added to provide a user desktop display corresponding to the application access control information for the user stored at the on-demand server 22, 22'. Accordingly, all the users that are logged onto on-demand servers 22, 22' may see the new application on their desktops and start using them. The display refresh for a new application is preferably limited to user's having access to the new application.

As will be appreciated by those of skill in this art, the above-described aspects of the present invention in the figures may be provided by hardware, software, or a combination of the above. Various components of the application management system of the present invention may, in practice, be implemented by a microcontroller including input and output ports and running software code, by custom or hybrid integrated circuits, by discrete components or by a combination of the above. Similarly, various of the operations may be implemented as software programs, such as JAVA™ applets, executing on a workstation, such as servers 22, 22' or clients 24, 24', 26, 26". More generally, as described above, operations according to the present invention may be realized in the hardware of existing on-demand servers 22, 22' which, when so configured, provide an application management system for a network according to the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for distribution of application programs to a target on-demand server on a network comprising the following executed on a centralized network management server coupled to the network:

providing an application program to be distributed to the network management server;

specifying a source directory and a target directory for distribution of the application program;

preparing a file packet associated with the application program and including a segment configured to initiate registration operations for the application program at the target on-demand server; and distributing the file packet to the target on-demand server to make the application program available for use by a user at a client.

2. A method according to claim 1 wherein the network management server is a Tivoli™ server.

3. A method according to claim 1 wherein the segment configured to initiate registration operations includes an import data file and a call to an import program executing on the target on-demand server to install and register the file packet associated with the application program on the target on-demand server in a manner that makes it recognized and available to the user at the client.

4. A method according to claim 3 wherein registration operations include maintaining at the target on-demand server a profile management list identifying application programs available for use by the user and wherein the method further comprises updating the profile management list at the target on-demand server to make the application program available for use by the user.

5. A method according to claim 4 wherein the profile management list includes a designation of authorized users for application programs identified in the profile management list.

6. A method according to claim 1 where the application program is provided as a JAVA™ applet and wherein the application program is registered based on a Universal Resource Locator (URL) address accessible to a browser application and wherein the segment configured to initiate registration operations includes a variable field into which the target on-demand server inserts its identification during registration operations.

7. A method according to claim 6 wherein the step of distributing comprises the step of distributing the file packet to a plurality of target on-demand servers each having an identification which may be inserted into the variable field at the target on-demand server.

8. A method according to claim 1 wherein distributing the file packet is preceded by executing a pre-distribution program at the network management server.

9. A method according to claim 8 wherein executing a pre-distribution program includes determining an environment for the application program that exists on the target on-demand server.

10. A method according to claim 9 wherein preparing a file packet includes including a selected version of an application launcher in the file packet, the selected version being selected based on the determined environment.

11. A method according to claim 1 wherein distributing the file packet is followed by executing an after-distribution program at the target on-demand server.

12. An application program distribution system for distributing application programs to a target on-demand server on a network executing on a centralized network management server coupled to the network, the system comprising:

means for providing to the network management server an application program to be distributed to remote servers;

means for specifying a source directory and a target directory for distribution of the application program;

means for preparing a file packet associated with the application program, the file packet including a segment configured to initiate registration operations for the application program at the target on-demand server; and means for distributing the file packet to the target on-demand server to make the application program available for use by a user at a client.

13. A system according to claim 12 wherein the network management server is a Tivoli™ server.

14. A system according to claim 12 wherein the segment configured to initiate registration operations includes an import data file and a call to an import program executing on the target on-demand server to install and register the file packet associated with the application program on the target on-demand server in a manner that makes it recognized and available to the user at the client.

15. A system according to claim 12 wherein the application program is provided as a JAVA™ applet and wherein the application program is registered based on a Universal Resource Locator (URL) address accessible to a browser application and wherein the segment configured to initiate registration operations includes a variable field into which the target on-demand server inserts its identification during registration operations.

16. A system according to claim 15 wherein the means for distributing comprises means for distributing the file packet to a plurality of target on-demand servers each having an identification which may be inserted into the variable field at the target on-demand server.

17. A computer program product for distributing application programs to a target on-demand server on a network executing on a centralized network management server coupled to the network, the computer program product comprising:

a computer-readable storage medium having computer-readable program code embodied in said medium, said computer-readable program code comprising:

computer readable program code that provides to the network management server an application program to be distributed to remote servers;

computer readable program code that specifies a source directory and a target directory for distribution of the application program;

computer readable program code means that prepares a file packet associated with the application program, the file packet including a segment configured to initiate registration operations for the application program at the target on-demand server; and computer readable program code means that distributes the file packet to the target on-demand server to make the application program available for use by a user at a client.

18. A computer program product according to claim 17 wherein the network management server is a Tivoli™ server.

19. A computer program product according to claim 17 wherein the segment configured to initiate registration operations includes an import data file and a call to an import program executing on the target on-demand server to install and register the file packet associated with the application program on the target on-demand server in a manner that makes it recognized and available to the user at the client.

20. A computer program product according to claim 17 wherein the application program is provided as a JAVA™ applet and wherein the application program is registered based on a Universal Resource Locator (URL) address accessible to a browser application and wherein the segment configured to initiate registration operations includes a variable field into which the target on-demand server inserts its identification during registration operations.

21. A computer program product according to claim 20 wherein the computer readable program code that distributes comprises computer readable program code that distributes the file packet to a plurality of target on-demand servers each having an identification which may be inserted into the variable field at the target on-demand server.

* * * * *